US012728058B2

(12) United States Patent
Murdoch et al.

(10) Patent No.: US 12,728,058 B2
(45) Date of Patent: Sep. 8, 2026

(54) PRONE MAT DEVICE AND METHODS

(71) Applicant: Osteon Medical LLC, Grand Island, NE (US)

(72) Inventors: Nathan William Murdoch, Grand Island, NE (US); Cody L. Evans, Grand Island, NE (US)

(73) Assignee: Osteon Medical LLC, Grand Island, NE (US)

( * ) Notice: Subject to any disclaimer, the term of this patent is extended or adjusted under 35 U.S.C. 154(b) by 347 days.

(21) Appl. No.: 18/275,281

(22) PCT Filed: Feb. 1, 2022

(86) PCT No.: PCT/US2022/014694
§ 371 (c)(1),
(2) Date: Aug. 1, 2023

(87) PCT Pub. No.: WO2022/169745
PCT Pub. Date: Aug. 11, 2022

(65) Prior Publication Data

US 2024/0115451 A1 Apr. 11, 2024

Related U.S. Application Data

(60) Provisional application No. 63/145,154, filed on Feb. 3, 2021.

(51) Int. Cl.
*A61G 13/12* (2006.01)
*A61G 7/07* (2006.01)

(52) U.S. Cl.
CPC ............ *A61G 13/121* (2013.01); *A61G 7/07* (2013.01); *A61G 2200/325* (2013.01)

(58) Field of Classification Search
None
See application file for complete search history.

(56) References Cited

U.S. PATENT DOCUMENTS

| | | | | |
|---|---|---|---|---|
| 2,398,940 A | | 4/1946 | Jones | |
| 3,828,377 A | | 8/1974 | Fary | |
| 5,269,035 A | * | 12/1993 | Hartunian | A47C 20/026 5/639 |
| 6,842,924 B1 | * | 1/2005 | Walters | A47C 20/026 5/636 |
| 7,020,918 B1 | * | 4/2006 | Tinsley | A61G 13/009 5/652 |
| 10,321,764 B2 | * | 6/2019 | Caluwaert | A47C 20/02 |
| 2002/0184706 A1 | * | 12/2002 | Riach | A61B 6/0421 5/640 |
| 2006/0253985 A1 | * | 11/2006 | Skripps | A61G 13/129 5/622 |

OTHER PUBLICATIONS

PCT International Preliminary Report on Patentability in International Appln. No. PCT/US2022/014694, mailed on Aug. 3, 2023, 9 pages.
PCT International Search Report and Written Opinion in International Appln. No. PCT/US2022/014694, mailed on Apr. 19, 2022, 16 pages.

* cited by examiner

*Primary Examiner* — Adam C Ortiz
(74) *Attorney, Agent, or Firm* — Fish & Richardson P.C.

(57) ABSTRACT

Some embodiments described herein include a patient positioning system configured to orient a patient comfortably in a prone position for an extended period of time during a medical procedure, such as a kyphoplasty procedure.

19 Claims, 13 Drawing Sheets

PRONE MAT DEVICE AND METHODS

CROSS-REFERENCE TO RELATED APPLICATIONS

This application is a National Stage application under 35 U.S.C. § 371 of International Application No. PCT/US2022/014694, having an International Filing Date of Feb. 1, 2022, which claims the benefit of U.S. Provisional Application Ser. No. 63/145,154, filed Feb. 3, 2021. The disclosure of the prior application is considered part of (and is incorporated by reference in) the disclosure of this application.

TECHNICAL FIELD

This disclosure relates to patient positioning systems for medical procedures.

BACKGROUND

During many medical procedures, including some surgical procedures, a patient's body should be maintained in a prone position to more effectively perform the procedure. For example, during a kyphosis procedure, one or more coaxial 8-10 gauge bone introducer needles are inserted under fluoroscopic guidance into one or more fractured vertebral bodies utilizing a bipedicular, unipedicular, or extrapedicular approach. In order to perform a kyphosis procedure, the patient is normally placed in a prone position with a variety of padding pieces so as to provide the surgeon with proper access to the surgical site.

SUMMARY

Some embodiments described herein include a patient positioning system configured to orient a patient comfortably in a prone position for an extended period of time during a medical procedure, such as a kyphoplasty procedure. In particular variations described below, the patient positioning system can provide added convenience to the medical practitioner by readily shifting from a collapsed configuration (e.g., for storage or portability) to an operative configuration (for supporting a patient on a medical table). Optionally, the patient positioning system can include a body portion and a head portion that are movably connected to one another while the head portion further includes an adjustment mechanism configured to maintain the head portion in a selected one of a set of orientations relative to the body portion (and relative to the medical table).

Particular implementations include a patient positioning system including a mat and a removable cover. The mat includes a body portion and a head portion coupled to the body portion. The body portion is configured to support at least a portion of a patient's body in a prone position. The head portion includes a headrest configured to support a patient's head and an adjustable support leg coupled to the headrest. The removable cover is configured to releasably couple to the headrest.

Implementations can include one or more of the following features.

In some implementations, the body portion includes a first mat section and a second mat section coupled to the first mat section, the second mat section being configured to fold relative to the first mat section.

In some implementations, the head portion is configured to fold relative to the first mat section In some implementations, the body portion includes a first flexible connector coupled to and extending along a first side to the first mat section and coupled to and extending along a second side to the second mat section; and a second flexible connector coupled to and extending along a first side to the headrest and coupled to and extending along a second side to the first mat section. In some implementations, the second mat section is configured to fold towards the first mat section along the first flexible connector. In some implementations, the head portion is configured to fold towards the first mat section along the second flexible connector.

In some implementations, the body portion further includes comprises a handle coupled to the first mat section or the second mat section.

In some implementations, the first mat section and the second mat section include a deformable material.

In some implementations, the first mat section and the second mat section each include a curved upper surface.

In some implementations, the first mat section and the second mat section each include a polymer material.

In some implementations, the support leg can be adjusted between an extended position and a retracted position, and adjusting the support leg changes an angle of the headrest relative to the body portion of the mat.

In some implementations, the adjustable support leg is configured to fold inwards towards the headrest; and the headrest is configured to fold inwards toward the body portion of the mat.

In some implementations, the support leg is configured to prevent a patient's face from contacting a surface on which the body portion is positioned.

In some implementations, the support leg includes two telescoping support legs coupled to opposite sides of the headrest.

In some implementations, the removable cover includes a foam material configured to support a patient's face.

In some implementations, the headrest and the removable cover each define an opening therethrough for accommodating a patient's face when a patient is lying in the prone position.

In some implementations, the headrest and the removable cover each define a notch configured to route a medical instrument, line, or tube around the patient's head.

In some implementations, the patient positioning system includes one or more fastening elements configured to releasably couple the removable cover to the headrest In some implementations, the one or more fastening elements configured to releasably couple the removable cover to the headrest include a first hook and loop fastener positioned on a top surface of the headrest; and a second hook and loop fastener positioned on a bottom surface of the cover, wherein the second hook and loop fastener is configured to releasably couple to the first hook and loop fastener.

In some implementations, the patient positioning system includes a protective covering configured to cover the mat and the removable cover.

In some implementations, the protective covering includes paper, cloth, or polymer material.

In particular implementations, a method includes positioning a patient's body in a prone position on a body portion of a mat, positioning a patient's head on a removable cover releasably coupled to head portion of the mat, the removable cover having an opening therethrough and being configured to support a patient's face, and performing a medical procedure on the patient.

Implementations can include one or more of the following features.

In some implementations, performing a medical procedure on the patient includes adjusting a curvature of a neck of the patient using the head portion of the mat.

In some implementations, the head portion of the mat includes a headrest configured to support the patient's head and an adjustable support leg coupled to the headrest; and adjusting the curvature of the patient's neck includes adjusting a length of the support leg.

In some implementations, adjusting the curvature of a neck of the patient using the head portion of the mat comprises reducing the curvature of a targeted portion of the patient's neck.

In some implementations, reducing the curvature of the targeted portion of the patient's neck includes retracting the support leg.

In some implementations, the method includes prior to positioning the patient's body on the body portion of the mat, positioning a protective covering over the mat and the removable cover.

In some implementations, the method includes removing the protective covering after performing the medical procedure.

In some implementations, the method includes folding the mat after performing the medical procedure.

In some implementations, the body portion of the mat includes a first mat section and a second mat section foldably coupled to the first mat section; and folding the mat includes folding the head portion of the mat inwards towards the first mat section and folding the second mat section inwards towards the first mat section.

In some implementations, the head portion includes a headrest configured to support the patient's head and an adjustable support leg coupled to the headrest; and folding the head portion of the mat inwards towards the first mat section includes folding the support leg to be positioned against the headrest.

In some implementations, the method includes removing the removable cover after performing the medical procedure.

In some implementations, the method includes prior to positioning the patient's body on the body portion of the mat, unfolding the mat onto a surface.

In some implementations, the surface is a medical table.

In some implementations, the surface is a hospital bed.

In some implementations, performing the medical procedure includes performing a kyphoplasty procedure.

In some implementations, wherein performing the medical procedure includes performing a ventilation procedure or an intubation procedure.

In some implementations, performing the medical procedure includes performing a procedure to improve a patient's respiration.

Some embodiments described herein can provide one or more of the following advantages. First, embodiments described herein can increase patient comfort during medical procedures by comfortably supporting and assisting a patient to lie in a prone position during a medical procedure. Second, embodiments described herein can improve the performance of certain medical procedures by assisting physicians and medical care providers in properly positioning one or more parts of a patient's body, such as the patient's head and neck, for the medical procedure. Third, embodiments described herein can provide improved portability and ease of storage for mats and systems used for positioning a patient during a medical procedure. Fourth, embodiments described herein can prolong the amount of time that a patient is able to lie in a prone position, which can improve blood oxygenation in patients with acute respiratory distress syndrome (ARDS).

The details of one or more embodiments are set forth in the accompanying drawings and the description below. Other features, objects, and advantages will be apparent from the description and drawings, and from the claims.

DETAILED DESCRIPTION

Figure 1:
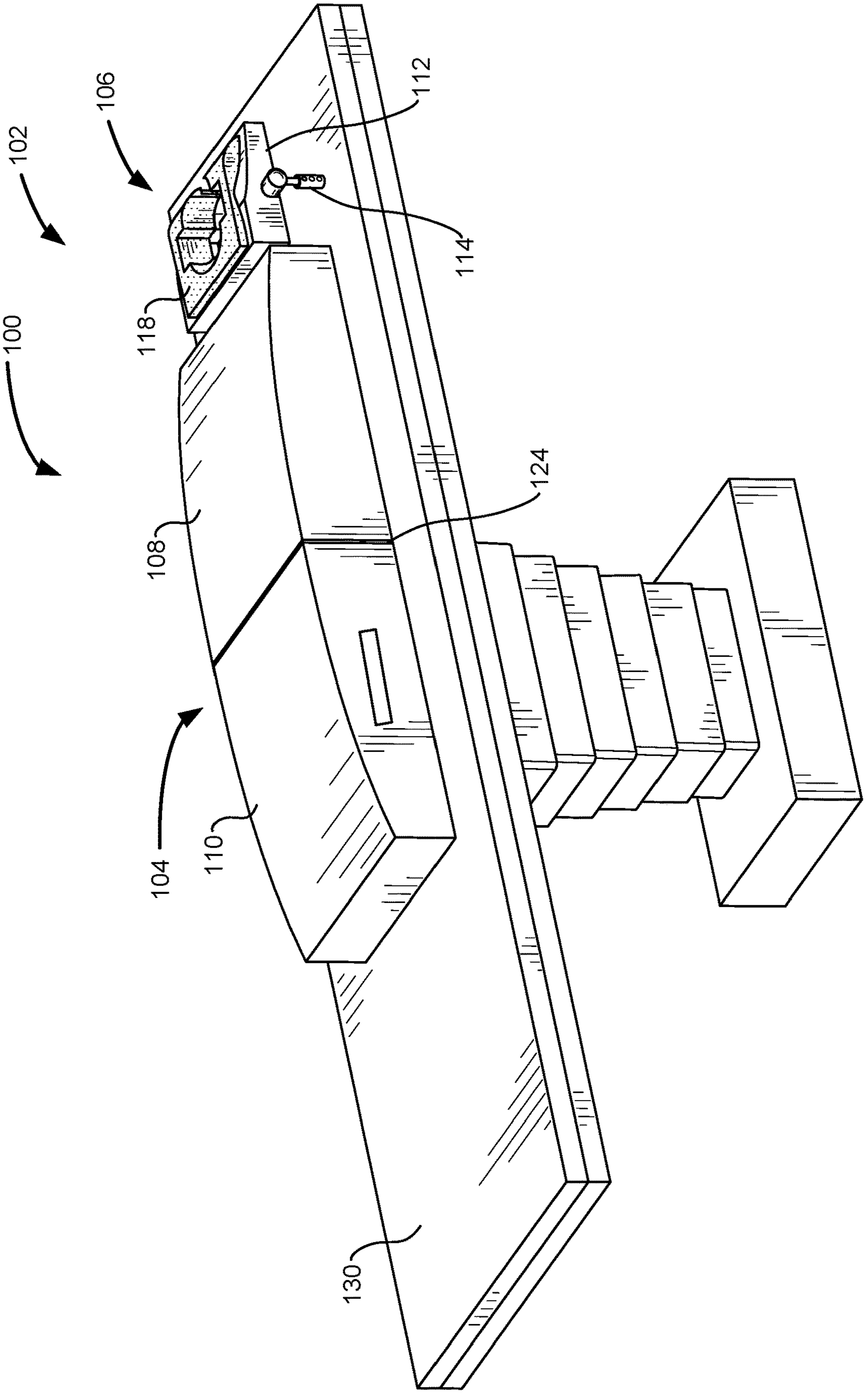
FIG. 1 is a front perspective view of a patient positioning system.

Referring to FIG. 1, some embodiments of a patient positioning system 100 are configured to allow a patient to comfortably lie flat in a prone position for an extended period of time. For example, the patient positioning system 100 can be used to help position a patient in a prone orientation and help maintain the patient's positioning during a medical procedure. For example, during performance of a kyphoplasty procedure, the patient positioning system 100 can be used to position the patient in a prone position to provide the physician with improved access to a targeted site along the patient's vertebrae. In addition, the patient positioning system 100 can orient the patient in a selected prone position to improve or alleviate breathing difficulties. The patient positioning system 100 can be used to assist patients in comfortably lying flat and maintaining a prone position in order to improve respiration and relieve breathing difficulties.

Figure 6:
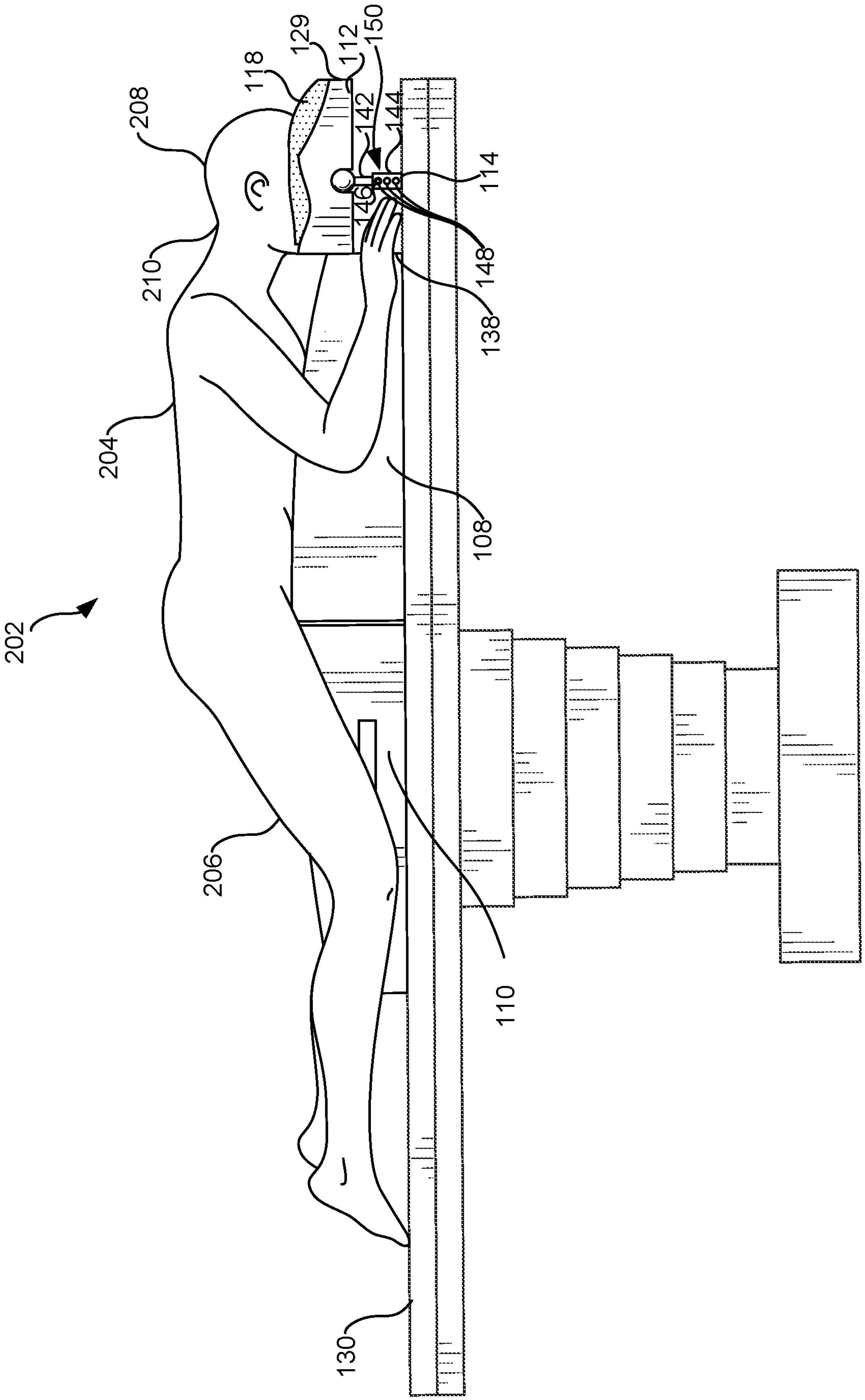
FIG. 6 is a side view of the patient positioning system of FIG. 1 with a patient positioned on the patient positioning system and the headrest of the system in a neutral position.
Figure 7:
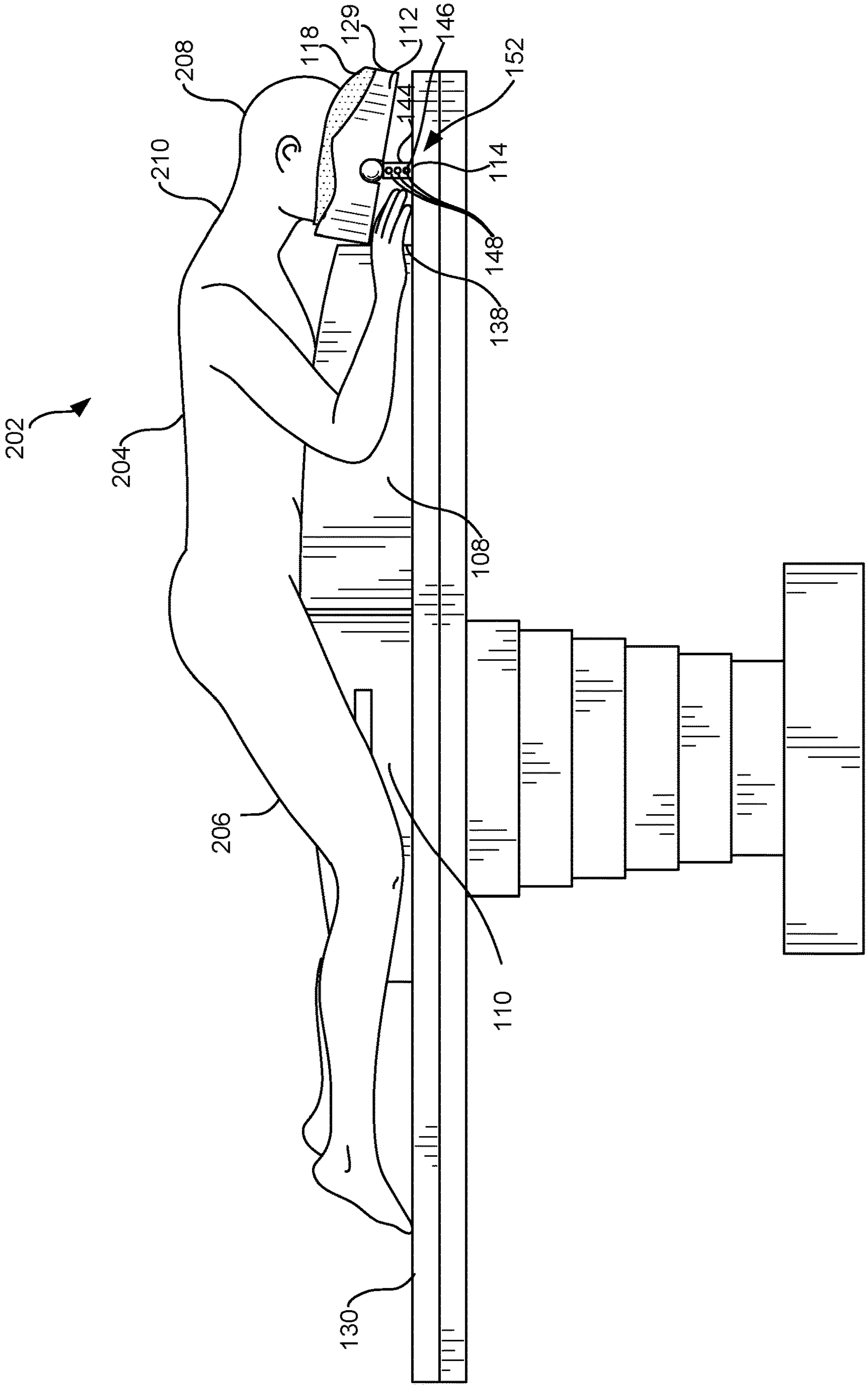
FIG. 7 is a side view of the patient positioning system of FIG. 1 with a patient positioned on the patient positioning system and the headrest of the system in a flexed position.

As can be seen in FIG. 1 the patient positioning system 100 includes a mat 102 having a body portion 104 and a head portion 106. The mat 102 can be placed on and supported by a surface, such a medical table 130, during performance of a medical procedure. The body portion 104 of the mat 102 includes a first mat section 108 and a second mat section 110. The mat sections 108, 110 can each be shaped to support a portion of the body of a patient positioned on the mat 102. For example, the body portion 104 of the mat can be configured to extend along the length of the patient's trunk (e.g., from the patient's chest to the patient's pelvis). In some implementations, the body portion 104 of the mat is further configured to support the patient's lower limbs (e.g., legs) in addition to supporting the patient's torso, as depicted in FIGS. 6 and 7.

Figure 5:
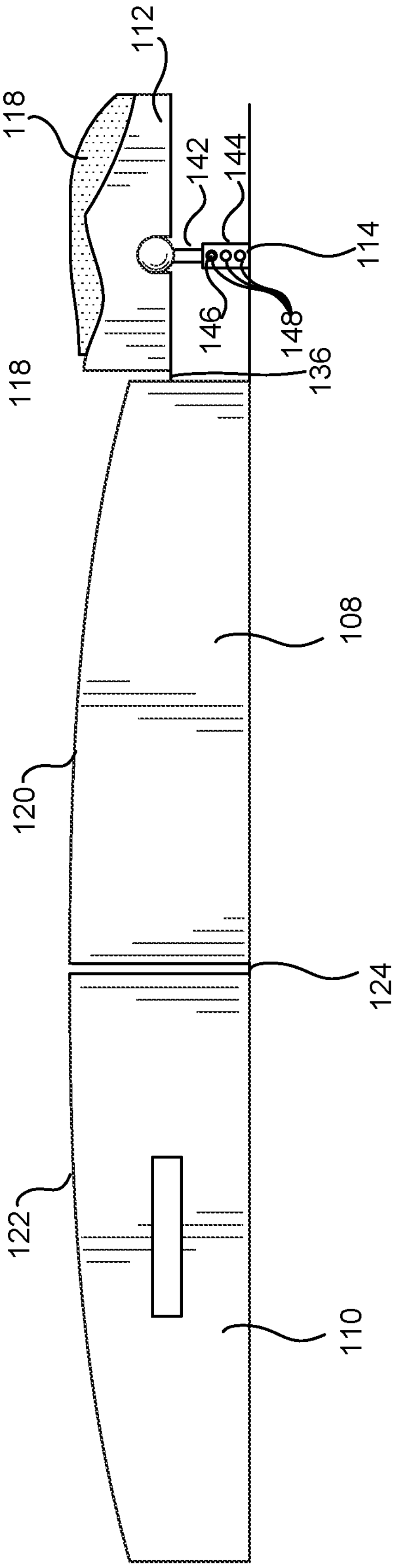
FIG. 5 is a side view of the patient positioning system of FIG. 1.

The body portion 104 of the mat 102 ergonomically supports a portion of the patient's body (e.g., the patient's torso and/or legs). For example, as depicted in FIG. 5, in some implementations, each of the mat sections 108, 110 have a curved upper surface 120, 122 configured to support a desired portion of the patient's body in a prone position, as depicted in FIGS. 6 and 7. In some implementations, each of the mat sections 108, 110 is wedge-shaped with the upper surface of the mat sections 108, 110 sloping away from one another.

The mat sections 108, 110 of the body portion 104 can be formed of a pliable material configured to support a patient's body while the patient is lying in the prone position for prolonged periods. In some implementations, the mat sections 108, 110 are each formed of or covered in a viscoelastic foam material, such as a polymer foam. In some implementations, the mat sections 108, 110 are coated or otherwise covered in a polymer or woven material, such as a vinyl material.

Figure 3:
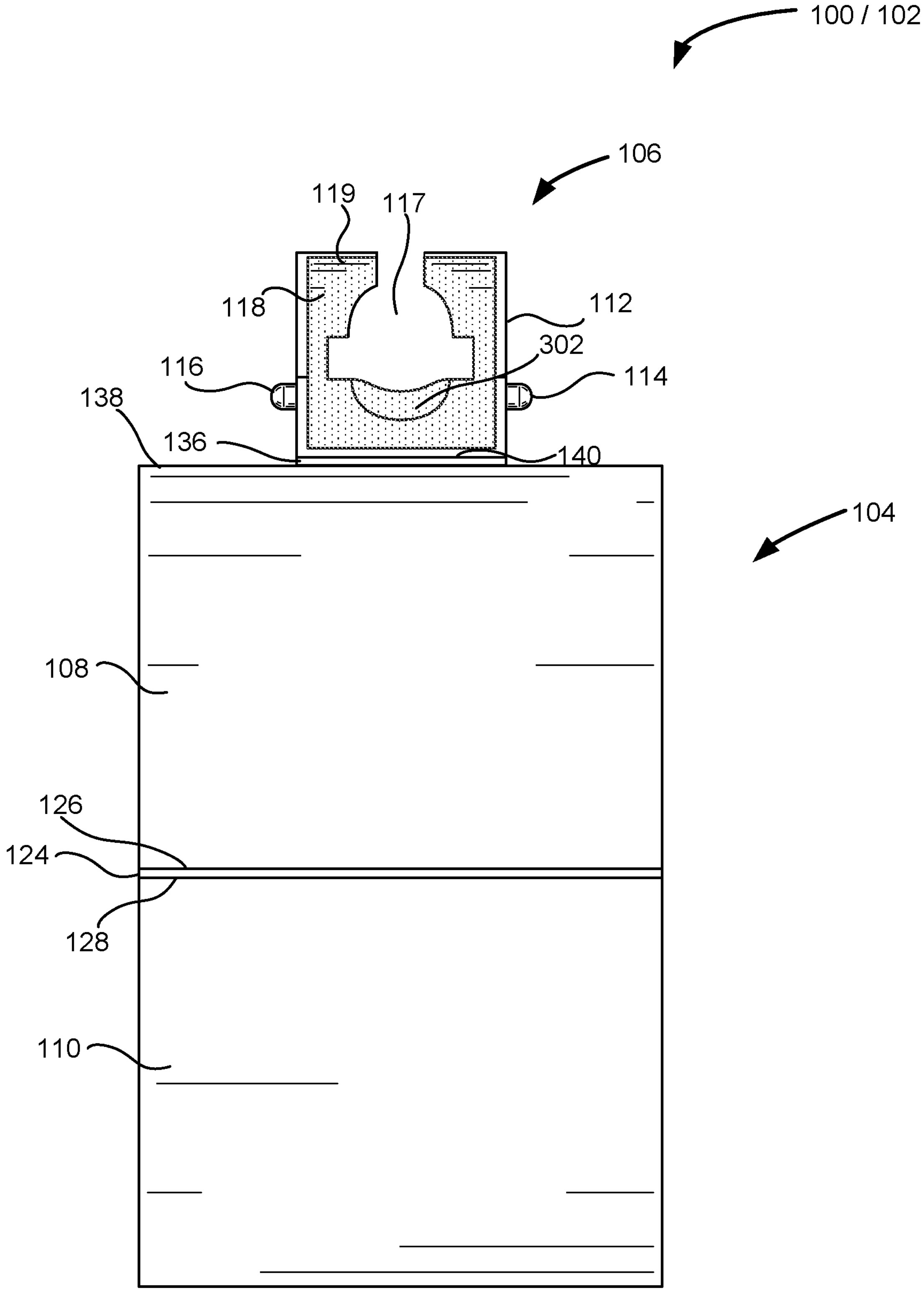
FIG. 3 is a top view of the patient positioning system of FIG. 1.
Figure 4:
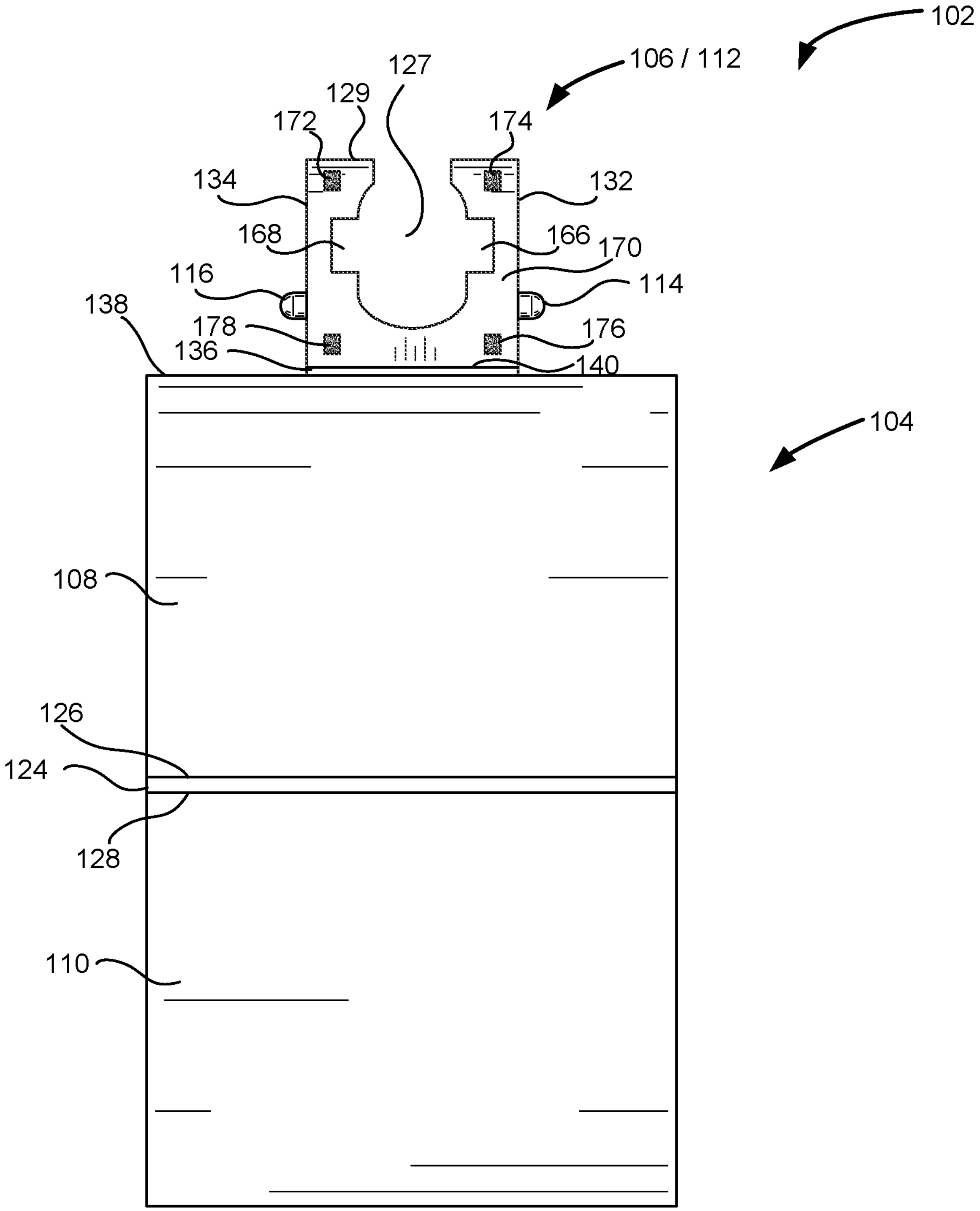
FIG. 4 is a top view of the mat of the patient positioning system of FIG. 1.

Optionally, the mat sections 108, 110 of the body portion 104 are foldably connected with one another. For example, as can be seen in FIGS. 1, 3, and 4, the first mat section 108 and the second mat section 110 are connected by a flexible connector 124, such as a length of flexible material defining a fold line or hingedly movable joint. Referring to FIG. 3, the flexible connector 124 is coupled along its length to a rear side 126 of the first mat section 108 and to a front side 128 of the second mat section 110.

In some implementations flexible connector 124 is formed of a thin, flexible material and is configured to be folded along its length. For example, in some implementations, the flexible connector 124 is a thin, flexible strip of a plastic material or woven material that is attached along its length to the first and second mat sections 108, 110. By folding the flexible connector 124 along its length, the first mat section 108 and the second mat section 110 can be folded inward towards one another, for example, for storage or transportation of the mat 102.

In some implementations, the first and second mat sections 108, 110 are additionally or alternatively coupled to one another using one or more mechanical fasteners, such as one or more buttons along a flexible web of material, releasable clasps configured to provide a pivotable coupling, or hook-and-loop fasteners along a flexible web of material.

Referring back to FIG. 1, the head portion 106 of the mat 102 includes a headrest 112 and an adjustment mechanism 114 coupled to the headrest 112 and configured to adjust the position of the headrest 112. The head portion 106 of the mat 102 is configured to support a patient's head when the patient is lying on a prone position on the mat 102.

Figure 2:
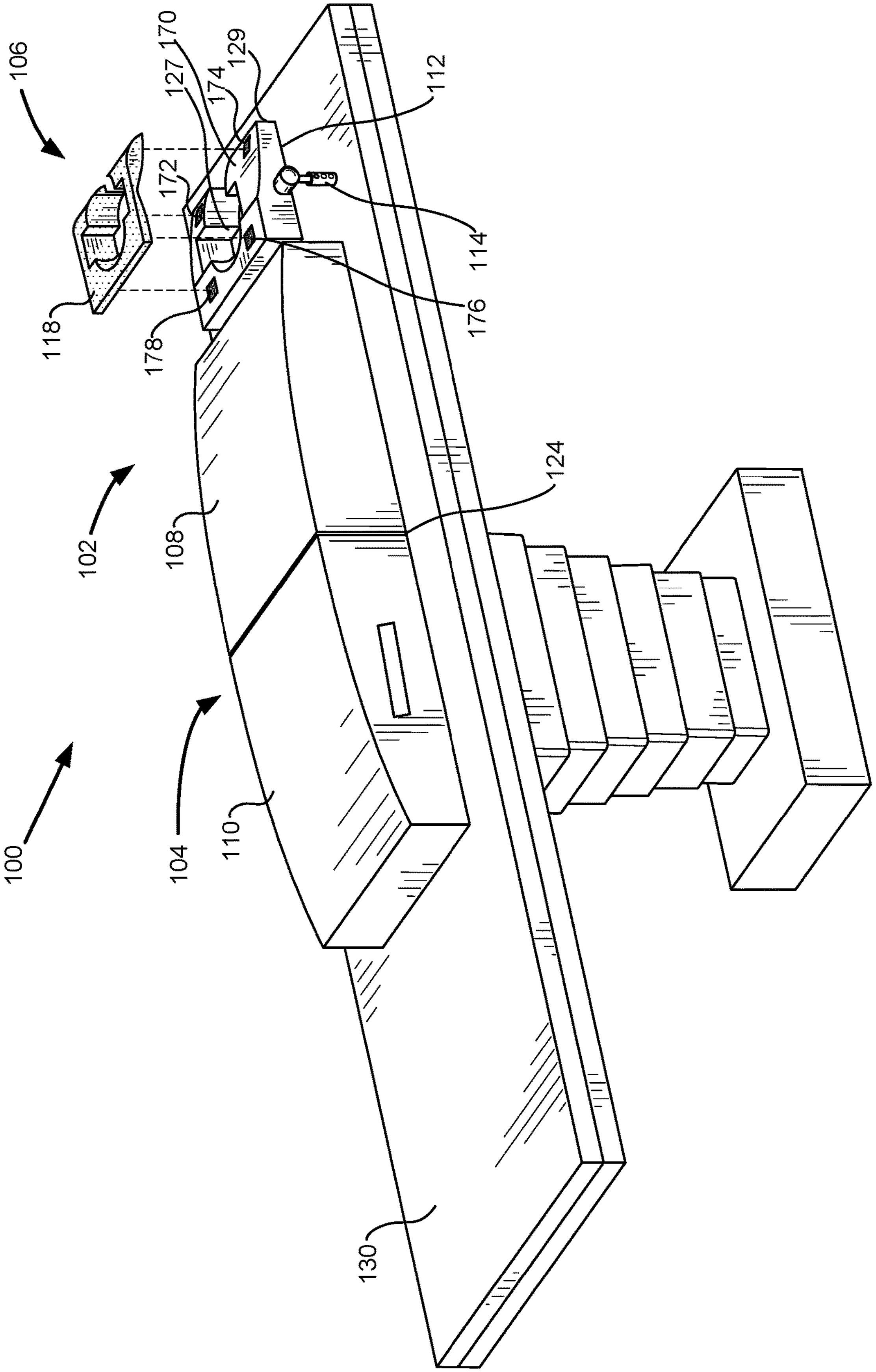
FIG. 2 is an exploded view of the patient positioning system of FIG. 1.

As can be seen in FIGS. 2 and 5, headrest 112 defines an opening 127 therethrough to expose the patient's face when the patient is lying in a face-down (e.g., prone) position on the mat 102. In some implementations, as depicted in FIGS. 1-4 and 5, the opening 127 extends through a front side 129 of the headrest 112. By extending through the front side 129 of the headrest 112, the opening 127 can be easily accessed by medical personnel in order to position medical equipment on or near the patient's head or face. For example, medical personnel can use the opening 127 through the headrest 112 to position or exchange oxygen support equipment being used to treat the patient, such as a nasal cannula, a facemask, or continuous positive airway pressure (C-PAP) equipment. In addition, the opening 127 through the headrest 112 provides the patient with additional comfort when being treated with exchange oxygen support equipment.

In some implementations, the opening 127 of the headrest defines one or more notches for routing medical equipment, such as tubes, catheter lines, or instruments around a patient's head during a medical procedure. For example, as depicted in FIG. 4, the opening 127 of headrest 112 defines a pair of notches 166, 168 on opposite sides 132, 134 of the headrest 112. Notches 166, 168 are configured to route one or more corresponding tubes, catheter lines, or instruments around a patient's head during a medical procedure. By routing medical equipment being used to treat the patient through the notches 166, 168, the patient's level of comfort can be improved and the formation of pressure wounds during prolonged procedures or prone positioning can be prevented.

Optionally, the headrest 112 is foldably connected to the first mat section 108 of the body portion 104 of the mat 102. For example, as can be seen in FIGS. 3 and 5, the first mat section 108 and the headrest 112 are connected to one another by a flexible connector 136, such as a length of flexible material defining a fold line or hingedly movable joint. Referring to FIG. 4, the flexible connector 136 is coupled along its length to a front side 138 of the first mat section 108 and to a rear side 140 of the headrest 112. The flexible connector 136 is formed of a thin, flexible material and is configured to be folded along its length. By folding the flexible connector 136 along its length, the headrest can be folded inwards towards the first mat section 108, for example, for storage or transportation of the mat 102.

In some implementations, the flexible connector 124 is a thin, flexible strip of a plastic material or woven material that is attached along its length to the first mat section 108 and the headrest 112. In some implementations, the flexible connector 136 is formed of a material that can be easily cleaned (e.g., between treatments).

The headrest 112 can be formed of a material configured to support a patient's head while the patient is lying in the prone position for prolonged periods. In some implementations, the headrest 112 is formed of a viscoelastic foam material, such as a polymer foam, or a gel material. In some implementations, the headrest 112 is coated or otherwise covered in a plastic or woven material, such as a vinyl material. In some implementations, the mat sections 108, 110 of the body portion 104 and the headrest 112 are formed of the same material.

In some implementations, an adjustment mechanism is coupled to the headrest 112 and is configured to adjust the position of the headrest 112 relative the body portion 104 of the mat 102 and the surface 130 (e.g., medical table) on which the mat 102 is positioned. For example, in some implementations, a foldable adjustment mechanism, such as a hinged connector, a flexible web of materials defining a fold line, or the like, can be coupled to headrest 112, and the position of the headrest 112 can be adjusted by folding the adjustment mechanism (e.g., to lower the headrest 112) or unfolding the adjustment mechanism (e.g., to raise the headrest 112).

Referring back to FIG. 1, in some implementations, the adjustment mechanism 114 comprises one or more adjustable support legs. For example, in some implementations, the head portion 106 of the mat 102 includes two support legs 114, 116 that are coupled to opposite sides 132, 134 of the headrest 112, as depicted in FIG. 4. Adjusting the length of the support legs 114, 116 changes the position of the headrest 112 relative the body portion 104 of the mat 102 and the surface 130 (e.g., medical table) on which the mat 102 is positioned. The length of the support legs 114, 116 can be configured to position the headrest 112 above the surface 130 on which the mat 102 is positioned and prevent the patient's face from contacting the surface when the patient is laying on the mat 102 in a prone position with the patient's head supported by the head portion 106 of the mat 102.

As will be described in further detail herein, the support legs 114, 116 can be rotatably coupled to the headrest 112 to allow the support legs 114, 116 to be rotated upwards towards the headrest 112 to position the support legs 114, 116 against the sides 132, 134 of the headrest 112. The support legs 114, 116 can be positioned against the sides 132, 134 of the headrest 112 as part of a process of folding the mat 102 for transportation or storage.

In some implementations, the support legs 114, 116 are telescopically expandable and retractable between two or more positions. For example, as can be seen in FIG. 5, support leg 114 includes an inner shaft 142 and an outer shaft 144 surrounding the inner shaft 142. The inner shaft 142 can extend and retract within the outer shaft 144 to adjust the overall length of the support leg 114. A depressible button 146 is positioned on the inner shaft 142 and is configured to fit into each of series of holes 148 along the outer shaft 144 to set the position of the leg 114. The depressible button 146 can be depressed into the inner shaft 142 to adjust the length of the support leg 114 and released into one of the holes 148 to lock the position of the inner shaft 142 relative to the outer shaft 144 and set the length of the support leg 114. Support leg 116 has the same structure as support leg 114 and is attached to the headrest 112 opposite support leg 114.

The length of the support legs 114, 116 can be adjusted to change the angle of the headrest 112 relative to the body portion 104 of the mat 102, which in turn adjusts the position of the patient's head and the curvature of the patient's neck. For example, FIG. 6 depicts a patient 202 laying in a prone position on the patient positioning system 100. The patient's torso 204 and legs 206 are supported by the body portion 104 of the mat 102, and the patient's head 208 is supported by the head portion 106 of the mat 102. The support legs 114, 116 are in a fully extended position 150, causing the headrest 112 to be positioned substantially parallel to the surface 130 on which the mat is positioned. As can be seen in FIG. 6, when the support legs 114, 116 are in the fully extended position and the headrest 112 is substantially parallel to the surface 130 on which the mat 102 is resting, the patient's head 208 is positioned to provide the patient's neck 210 with a particular amount of curvature.

Retracting the support legs 114, 116 from the fully extended position 150 changes the angle of the headrest 112 relative to surface 130 and body portion 104 of mat 102, which changes the position of the patient's head 208 and reduces for the curvature of the patient's neck 210. For example, FIG. 7 depicts the patient 202 laying in a prone position on the patient positioning system 100 with the support legs 114, 116 in a fully retracted position 152. As can be seen in FIGS. 6 and 7, by retracting the support legs 114, 116 from a fully extended position 150 (shown in FIG. 6) to a fully retracted position 152 (shown in FIG. 7), the front side 129 of the headrest 112 is lowered towards the surface 130 on which the mat 102 is positioned, which changes the angle of the headrest 112 relative to the surface 130 and the body portion 104 of the mat 102. As a result, the patient's forehead is lowered together with the front 129 of the headrest 112 towards the surface 130, which changes the curvature of the patient's neck 210.

Adjustability of the headrest position 112 allows medical personnel to adjust and optimize the positioning of a patient's spine based on the particular procedure being performed and the patient's anatomy. For example, the patient's neck 210 is flatter (e.g., more kyphotic) when the support legs 114, 116 are in the fully retracted position 152 (as shown in FIG. 7) compared to when the support legs 114, 116 are in the fully extended position 150 (as shown in FIG. 6). A medical provider can extend or retract the support legs 114, 116 to change the position of the headrest 112 in order to adjust the curvature of the patient's neck 210 based on the desired positioning for a medical procedure to be performed on the patient 202.

Figures 8A, 8B, 8C:
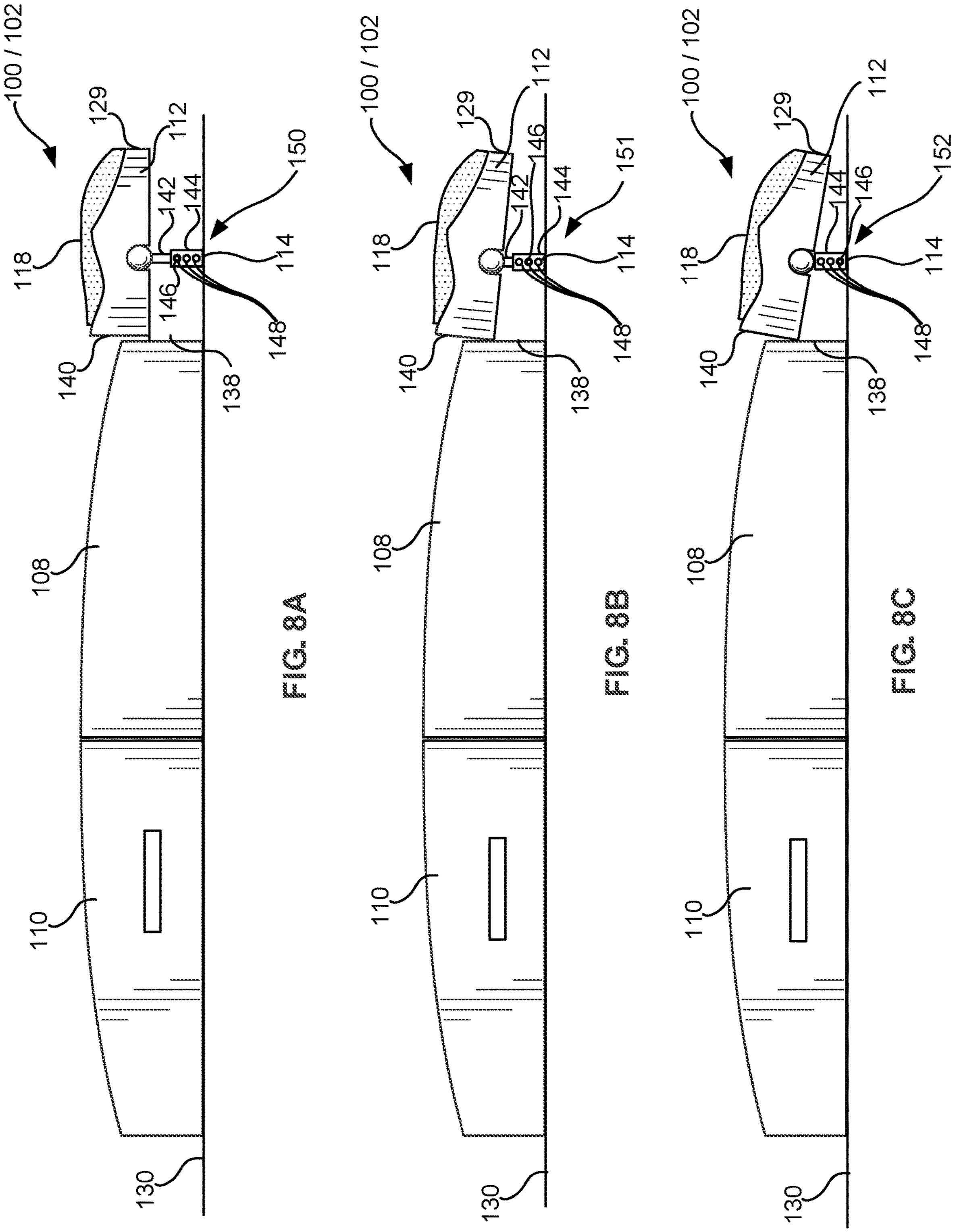
FIG. 8A-8C depict side views of the patient positioning system of FIG. 1 with the headrest in various positions.

An example process of adjusting the length of the support legs 114, 116 to adjust the angle of the headrest 112 relative to the body portion 104 of the mat 102 is depicted in FIGS. 8A-8C. FIG. 8A depicts the support legs 114, 116 in a fully extended position 150 with depressible button 146 on the inner shaft 142 inserted into the top hole 148 on the outer shaft 144. As discussed above, the headrest 112 is positioned substantially parallel to the surface 130 on which the mat is positioned when the support legs 114, 116 are in the fully extended position 150. In addition, the rear side 140 of the headrest 112 is parallel to the front side 138 of the first mat section 108 when the support legs 114, 116 are in a fully extended position 150. In some implementations, the rear side 140 of the headrest 112 is in contact with the front side 138 of the first mat section 108 when the support legs 114, 116 are in a fully extended position 150.

The support legs 114, 116 can be retracted to change the position of the headrest 112. For example, FIG. 8B depicts the support legs 114, 116 positioned in a partially retracted position 151. As can be seen in FIG. 8B, the depressible button 146 on the inner shaft 142 is inserted into the middle hole 148 on the outer shaft 144 when the support legs 114, 116 are in the partially retracted position 151. By retracting the support legs 114, 116, the front side 129 of the headrest 112 is lowered, and the angle between the rear side 140 of the headrest 112 and the front side 138 of the first mat section 108 is increased compared to when the support legs 114, 116 are in the fully extended position 150. In addition, retracting the support legs 114, 116 from the fully extended position 150 to the partially retracted position 151 changes the angle of the headrest 112 relative to the surface 130 on which the mat 102 is positioned compared to when the support legs 114, 116 are in the fully extended position 150.

Referring to FIG. 8C, the support legs 114, 116 can be further retracted into a fully retracted position 152. As can be seen in FIG. 8C, the depressible button 146 on the inner shaft 142 is inserted into the bottom hole 148 on the outer shaft 144 when the support legs 114, 116 are in the fully retracted position 152. By further retracting the support legs 114, 116 into the fully retracted position 152, the front side 129 of the headrest 112 is lowered closer to the surface 130, and the angle between the rear side 140 of the headrest 112 and the front side 138 of the first mat section 108 is further increased compared to when the support legs 114, 116 are in either the fully extended position 150 or the partially retracted position 151. In addition, retracting the support legs 114, 116 from the fully extended position 150 or the partially retracted position 151 to the fully retracted position 152 changes the angle of the headrest 112 relative to the surface 130 on which the mat 102 is position compared to when the support legs 114, 116 are in the fully extended position 150 or the partially retracted position 152.

As explained above, adjusting the position of the headrest 112 relative to the first mat section 108 and the surface 130 on which the mat 102 is positioned by adjusting the length of the support legs 114, 116 changes the position of the patient's head 208 and the curvature of the patient's neck 210. As such, a medical provider can adjust the position of the support legs 114, 116 to position the patient's head 208 and neck 210 in an optimal position for performing a medical procedure.

Referring back to FIG. 1, in some implementations, the patient positioning system 100 includes a removable cover 118 that can be releasably coupled to the headrest 112 of the mat 102. The removable cover 118 is configured to support and provide comfort to the face of patient that is laying in a prone position on the mat 102 with his or her head supported by the head portion 106 of the mat 102.

In some implementations, the removable cover 118 is formed of a deformable material that is configured to conform to the patient's face when the patient laying in a prone position on the mat 102 with his or her head supported by the head portion 106 of the mat 102. The removable cover 118 may be of a polymer material, such as polymer foam material, a gel material, or a biodegradable medical grade material. In some implementations, the removable cover 118 is made of a disposable material such that the removable cover 118 can be disposed of and replaced after each medical procedure performed using the mat 102. In some implementations, the removable cover 118 is formed of a material that is less stiff than the material forming the headrest 112, and, as a result, the removable cover 118 more closely conforms to and cushions the patient's face than the headrest 112.

Figure 9A:
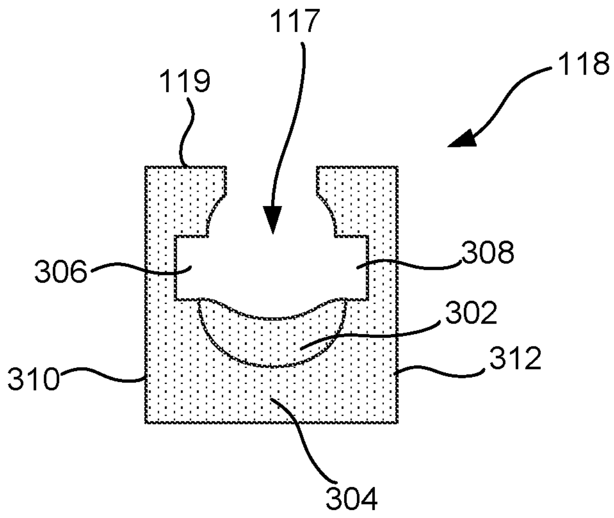
FIG. 9A is a top view of a removable cover of the patient positioning system of FIG. 1.
Figure 9B:
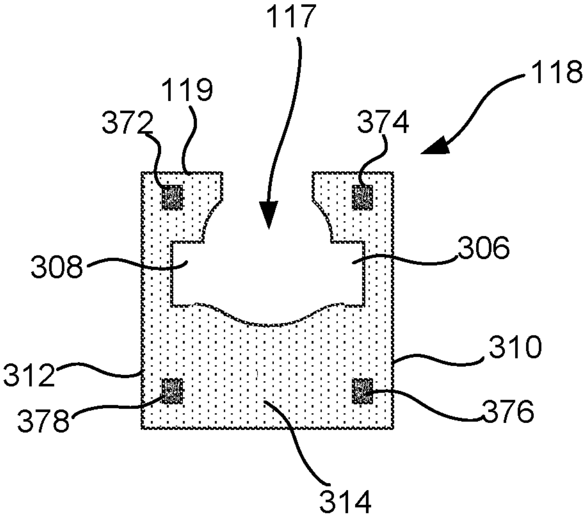
FIG. 9B is a bottom view of a removable cover of the patient positioning system of FIG. 1.

Referring to FIGS. 3, 9A, and 9B, the removable cover 118 defines an opening 117 therethrough to expose the patient's face when the patient is lying in a face-down (e.g., prone) position on the mat 102. In some implementations, as depicted in FIGS. 3, 9A, and 9B, the opening 117 extends through a front side 119 of the removable cover 118. By extending through the front side 119 of the removable cover 118, the opening 117 can be easily accessed by medical personnel in order to position medical equipment on or near the patient's head or face. For example, medical personnel can use the opening 117 through the removable cover 118 to position or exchange oxygen support equipment being used to treat the patient, such as a nasal cannula, a facemask, or continuous positive airway pressure (C-PAP) equipment. In addition, the opening 117 through the removable cover 118 provides the patient with additional comfort when being treated with exchange oxygen support equipment.

As can be seen in FIG. 3, the opening 117 defined by the removable cover 118 and the opening 127 formed through the headrest 112 are aligned when the removable cover 118 is coupled to the headrest 112. By including an opening 117, 127 through both the removable cover 118 and the headrest 112, the patient's face is exposed and the patient is able to breathe freely when the removable cover 118 is coupled to the headrest 112 and the patient's head 208 is positioned on the removable cover 118.

As can be seen in FIGS. 3 and 9A, a depression 302 is defined in top surface 304 of the removable cover 118 proximate the bottom of the opening 117 through the removable cover 118. The depression 302 is configured to support the chin of a patient that is lying on the mat 102 in a prone position with their head placed on the removable cover 118 (for example, as depicted in FIGS. 6 and 7). Alternatively, in some implementations, the removable cover 118 can be configured without the depression 302 such that the removable cover 118 engages a portion of the patient's face while avoiding contact with patient's chin.

In some implementations, the opening 117 through the removable cover 118 defines one or more notches for routing one or more tubes, catheter lines, or instruments around a patient's head during a medical procedure. For example, as depicted in FIGS. 9A and 9B, the opening 117 through the removable cover 118 defines a pair of notches 306, 308 on opposite sides 310, 312 of the removable cover 118. Notches 306, 308 are configured to route one or more corresponding tubes, catheter lines, or instruments around a patient's head during a medical procedure. As can be seen in FIG. 3, the notches 306, 308 in the removable cover 118 align with the notches 166, 168 in the headrest 112 when the removable cover 118 is coupled to the headrest 112.

The removable cover 118 can be releasably coupled to the headrest 112 of the mat 102 using one or more fastening mechanisms. For example, prior to positioning a patient on the mat 102 for a medical procedure, a clinician may attach a removable cover 118 onto the top surface 170 of the headrest 112 to provide the patient's face with additional support and comfort.

By releasably coupling the removable cover 118 to the headrest 112, the removable cover 118 can be repeatedly removed and attached to the headrest 112, which allows for improved ease of cleaning and sanitizing the patient positioning system 100. For example, in some implementations, the removable cover 118 is removed after performing a medical procedure on a first patient and replaced with another (e.g., sanitized) removable cover prior to performing a medical treatment on a second patient using the mat 102.

As can be seen in FIGS. 2, 5, and 9B, in some implementations, the top surface 170 of the headrest 112 can include one or more fastening mechanisms 172, 174, 176, 178 and the bottom surface 314 of the removable cover 118 can include one or more corresponding fastening mechanism 372, 374, 376, 378 configured to engage with the fastening mechanisms 172, 174, 176, 178 on the headrest 112. In some implementations, the headrest 112 includes four fastening mechanisms 172, 174, 176, 178 with each fastening mechanism 172, 174, 176, 178 being positioned on a corner of the top surface 170 of the headrest 112, as depicted in FIG. 4, and the removable cover includes four corresponding fastening mechanisms 372, 374, 376, 378 with each fastening mechanism 372, 374, 376, 378 positioned on a corner of the bottom surface 314 of the removable cover 118, as depicted in FIG. 9B. As such, when the bottom surface 314 of the removable cover 118 is aligned with and positioned on the top surface 170 of the headrest 112, the fastening mechanisms 172, 174, 176, 178 of the headrest 112 engage with the fastening mechanisms 372, 374, 376, 378 on the removable cover 118, releasably coupling the removable cover 118 onto the headrest 112.

The fastening mechanism 172, 174, 176, 178, 372, 374, 376, 378 on the headrest 112 and the removable cover 118 can include fastening mechanisms that releasably couple the removable cover 118 to the headrest 112 such that the removable cover 118 can be removed from the headrest 112 without damaging the removable cover 118 or the headrest 112. In some implementations, the fastening mechanisms 172, 174, 176, 178, 372, 374, 376, 378 are each hook and loop fasteners. In some implementations, the fastening mechanisms 172, 174, 176, 178, 372, 374, 376, 378 are each formed of a material that can be easily cleaned (e.g., between treatments).

While the headrest 112 and removable cover 118 are depicted as each having four fastening mechanisms, other numbers of fastening mechanisms can be used. In addition, while the headrest 112 and removable cover 118 are depicted as having the same number of fastening mechanisms, in some implementations, the headrest 112 and removable cover 118 have different numbers of fastening mechanisms. Further, while both the headrest 112 and removable cover 118 are depicted as each having fastening mechanisms, in some implementations, only one of the headrest 112 and the removable cover 118 has fastening mechanism(s).

Figure 10:
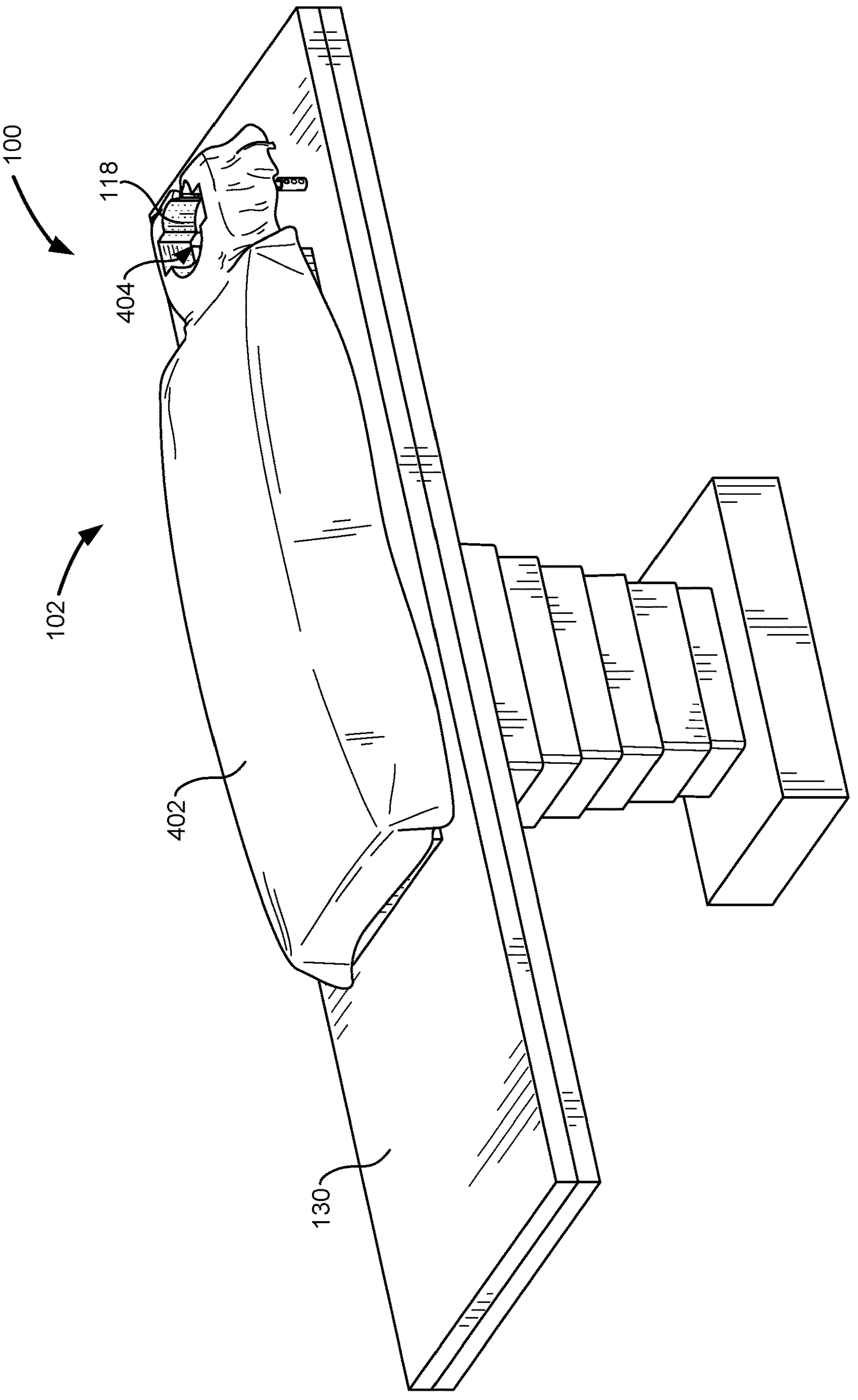
FIG. 10 is a front perspective view of a patient positioning system of FIG. 1 with a protective covering.

In some implementations the patient positioning system 100 includes a protective covering 402 to cover all or part of the mat 102 and the removable cover 118. For example, FIG. 10 depicts a protective covering 402 that is positioned over and covers the mat 102 and the removable cover 118 of the patient positioning system 100. As can be seen in FIG. 10, the protective covering includes an opening 404 therethrough that corresponds to and aligns with the openings 117, 127 through the headrest 112 and the removable cover 118. By including an opening 404 in the protective covering 402 that aligns with the openings 117, 127 through the removable cover 118 and the headrest 112, the patient's face is exposed and the patient is able to breathe freely when the protective covering 402 is positioned over the removable cover 118 and/or the headrest 112 and the patient's head 208 is positioned on the removable cover 118 or the headrest 112.

A protective covering 402 may be placed over all or part of the mat 102 and the removable cover 118 prior to positioning a patient on the patient positioning system 100 to perform a medical treatment. By covering the mat 102 and/or the removable cover 118 with a protective covering 402 prior to performing a medical procedure using the patient positioning system 100, the patient positioning system 100 can be more easily and quickly prepared for the another procedure and patient. For example, in some implementations, the protective covering 402 is removed and disposed of after performing a medical procedure on a first patient and replaced with a new protective covering 402 prior to performing a medical treatment on a second patient using the patient positioning system 100. By changing out the protective covering 402 between patients, the mat 102 and removable cover 118 are kept clean over the course of multiple procedures. In some implementations, covering the removable cover 118 with a protective covering 402 for each medical procedure eliminates or reduces the need to replace or clean the removable cover 118 between procedures.

The protective covering 402 may be made of a biocompatible material, such as paper, cloth, or a polymer (e.g., having an antimicrobial surface). In some implementations, the protective covering 402 is made of a disposable material, such as paper, and is disposed of after completing a medical procedure performed using the protective covering 402. In some implementations, the protective covering 402 is made of a reusable material, such as plastic or cloth, and is sanitized for reuse after completing a medical procedure performed using the protective covering 402.

In some implementations, the protective covering 402 is attached to the mat 102 and/or the removable cover 118 using one or more fastening mechanisms. For example, the protective covering 402 can be attached to the mat 102 and/or the removable cover 118 using one or more elastic bands. In some implementations, the protective covering 402 is attached to the mat 102 and/or the removable cover 118 using one or more hook and loop fasteners, adhesive patches, or button-type fasteners.

While FIG. 10 depicts the protective covering 402 as being positioned on top of the mat 102 and the removable cover 118, in some implementations, the protective covering 402 is a sleeve, and the mat 102 and/or the removable cover 118 are inserted into the protective covering. In addition, while FIG. 10 depicts the protective covering 402 as covering both the mat 102 and the removable cover 118, in some implementations, the protective covering 402 only covers the body portion 104 of the mat 102. In some implementations, the protective covering 402 only covers the head portion 106 of the mat 102 and the removable cover 118. In some implementations, the protective covering 402 only covers the removable cover 118. In some implementations, separate protective coverings 402 are used to cover different parts of the mat 102 and the removable cover 118. For example, in some implementations, a first protective covering is used to cover the body portion 104 of the mat 102 and a second, separate protective covering is used to cover the head portion 106 of the mat 102 and the removable cover 118.

In some implementations, the patient positioning system 100 is configured to be folded into a folded configuration, for example for transportation and storage, and unfolded for use in positioning a patient for a medical procedure. A process of folding the patient positioning system 100 will now be described with reference to FIG. 11.

In some implementations, before folding the mat 102, the mat 102 is repositioned such that the bottom surfaces 180, 182 of the first and second mat sections 108, 110 are facing upwards and the curved upper surface 120, 122 of the body portion 104 of the mat 102 is resting on a surface (such as an medical table or a floor). For example, prior to folding the mat 102, a user (such as a physician or other medical care provider) can flip the mat 102 upside down onto the curved upper surface 120, 122 of the body portion 104 of the mat 102.

As shown in step 1102, the support legs 114, 116 of the head portion 106 of the mat 102 can be rotated downwards towards the headrest 112 until the support legs 114, 116 are positioned against the sides 132, 134 of the headrest 112.

Referring to step 1104, once the support legs 114, 116 are positioned against the sides 132, 134 of the headrest 112, the headrest 112 (as well any removable cover 118 coupled to the headrest 112) can be folded upwards until the bottom surface 171 of the headrest 112 is positioned against the front side 138 of the first mat section 108. For example, as previously discussed and as depicted in FIGS. 3-5 and 11, a front side 138 of the first mat section 108 and a rear side 140 of the headrest 112 are connected to one another by a flexible connector 136. By folding the flexible connector 136 along its length, the bottom surface 171 of the headrest 112 is positioned against the front side 138 of the first mat section 108.

In some implementations, the front side 138 of the first mat section 108 and/or the bottom surface 171 of the headrest 112 include one or more fastening mechanisms to fasten the headrest 112 against the front side 138 of the first mat section 108 in the folded position depicted at steps 1104-1108. In some implementations, the system 100 includes one or more fastening mechanisms for securing the headrest 112 against the front side 138 of the first mat section 108 in a folded configuration. For example, the system 100 can include one or more metal or plastic hinges or rods that can be used to secure the headrest 112 against the first mat section 108 in the folded configuration (e.g., as shown in steps 1106 and 1108).

Referring to step 1106, once the headrest 112 is folded against the first mat section 108, the second mat section 110 is folded upwards and inwards until the bottom surface 182 of the second mat section 110 is aligned and in contact with the bottom surface 180 of the first mat section 108. For example, as previously discussed and as depicted in FIGS. 3-5 and 11, the first mat section 108 and the second mat section 110 are connected by a flexible connector 124. For example, as depicted in FIGS. 3 and 4, the flexible connector 124 is coupled along its length to a rear side 126 of the first mat section 108 and to a front side 128 of the second mat section 110. By folding the flexible connector 124 along its length, the bottom surface 182 of the second mat section 110 is positioned against the bottom surface 180 of the first mat section 108, as depicted in folded configuration 1108.

In some implementations, the bottom surface 180 of the first mat section 108 and/or the bottom surface 182 of the second mat section 110 includes one or more fastening mechanisms to fasten the second mat section 110 against the bottom surface 180 of the first mat section 108 in the folded configuration 1108. In some implementations, the system 100 includes one or more fastening mechanisms to secure the second mat section 110 against the bottom surface 180 of the first mat section 108 in the folded configuration 1108. For example, the system 100 can include one or more hook and loop fasteners, straps, or button-type fasteners to secure the first mat section 108 and second mat section 110 in a folded configuration.

In some implementations, the mat 102 includes one or more handles to enable a user to more easily carry and transport the folded mat 102. For example, as depicted in FIG. 11, a handle 190 is coupled to a side of the body portion 104 of the mat 102 and can be used to carry the mat 102 when the mat 102 is in the folded configuration 1108.

Figure 11:
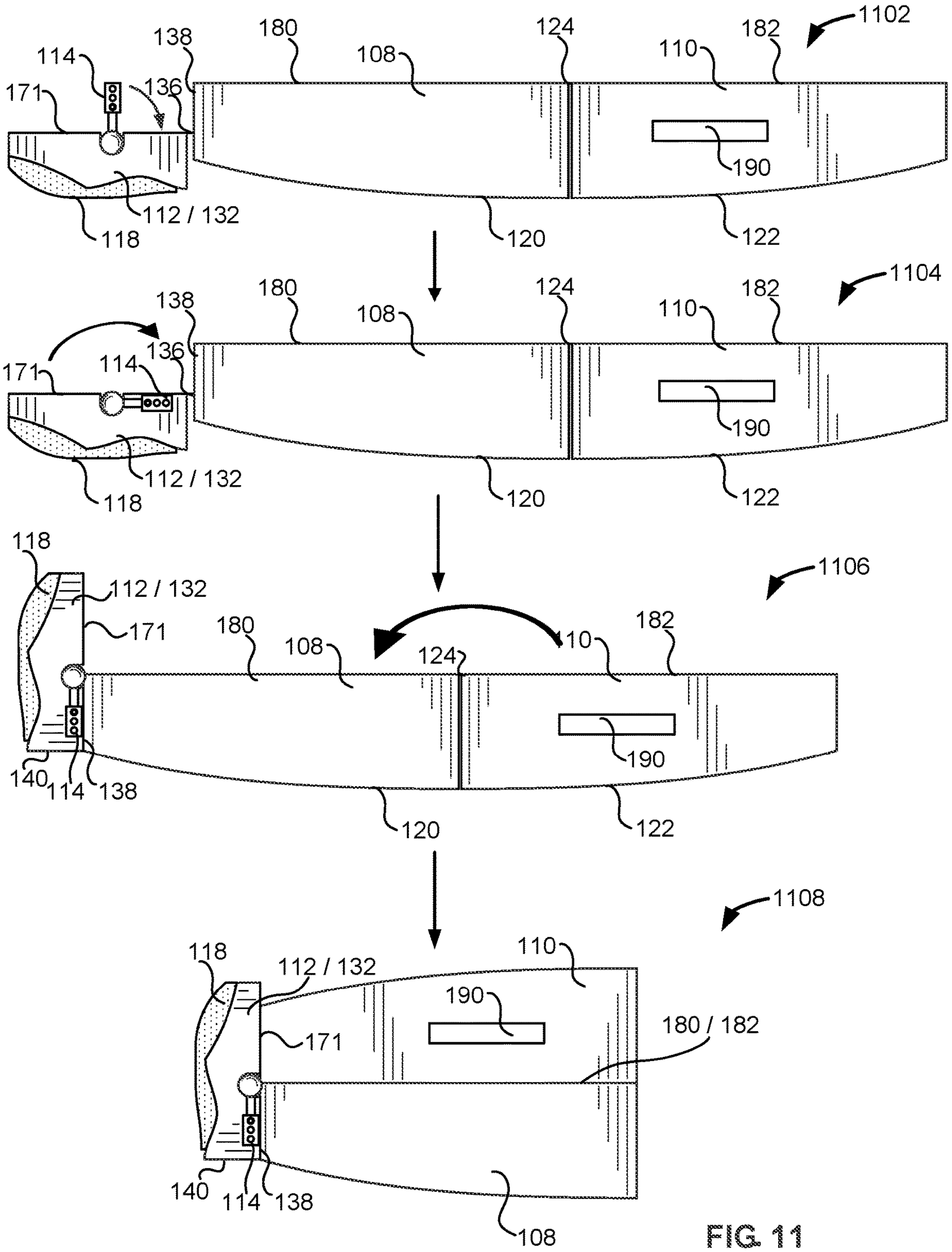
FIG. 11 depicts an example process of folding the patient positioning system of FIG. 1

While FIG. 11 depicts folding the mat 102 with the removable cover 118 coupled to the headrest 112, in some implementations, the removable cover 118 is removed from the headrest 112 prior to folding the mat 102.

Figure 12:
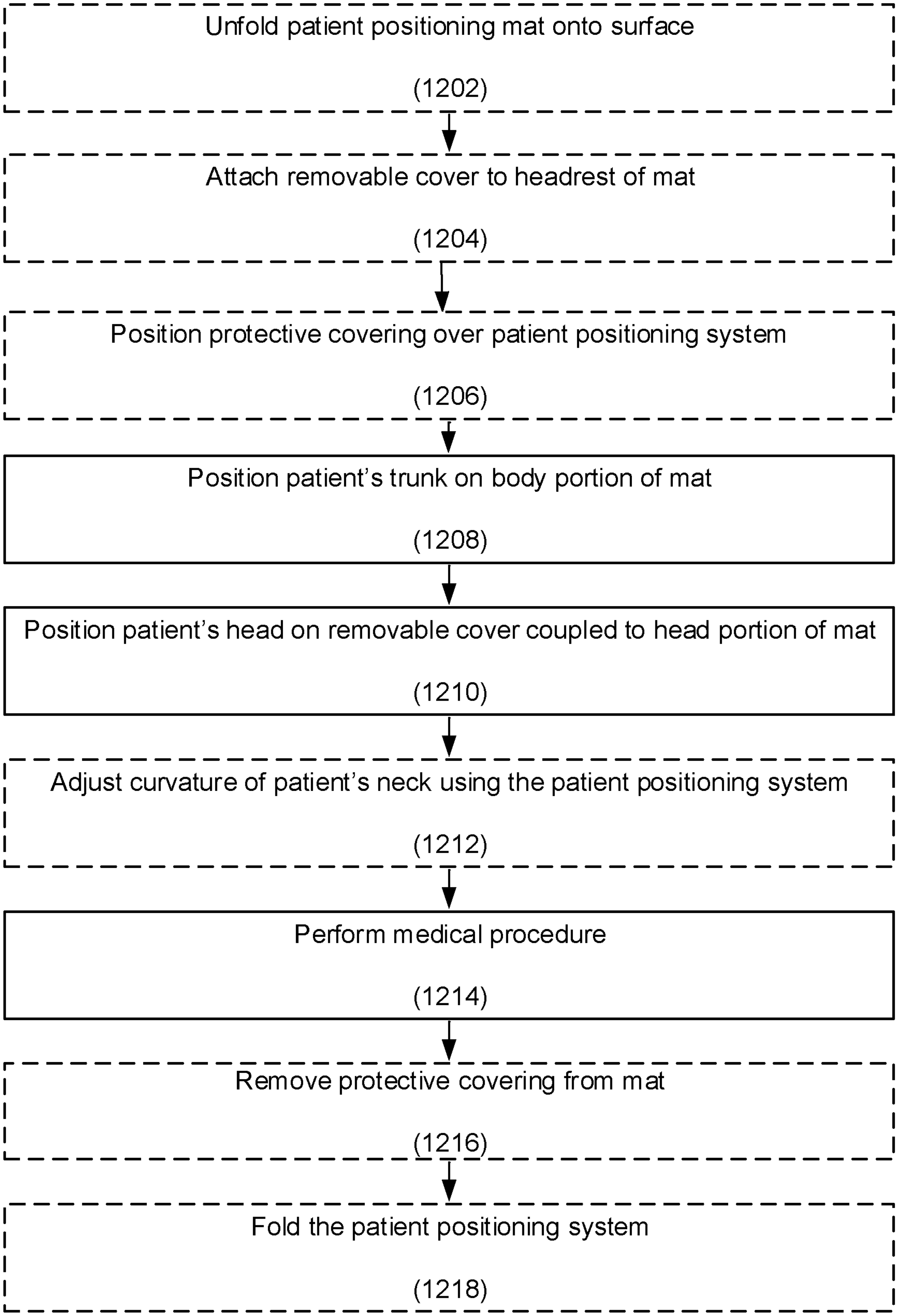
FIG. 12 is a flowchart of an example method of performing a medical procedure using a patient positioning system.

A method of performing a medical procedure using the patient positioning system 100 will now described with reference to FIGS. 1 and 12.

Prior to positioning a patient on the patient positioning system and performing a medical treatment, the patient positioning mat is unfolded onto a surface (1202). For example, the patient positioning mat 102 can be unfolded from a folded configuration (such as folded configuration 1108 depicted in FIG. 11). In some implementations, the mat 102 is unfolded by reversing the folding step 1102-1106 shown in FIG. 11. In some implementations, the mat 102 in unfolded onto a medical table 130, as shown in FIG. 1.

In some implementations, a removable cover is attached to a headrest portion of the mat (1204). For example, the removable cover 118 can be attached to the headrest 112 of the mat 102, as shown in FIG. 1. As previously discussed, the removable cover 118 can be coupled to the headrest 112 using one or more fastening mechanisms on the removable cover 118 and/or the headrest 112. For example, the headrest 112 can includes four fastening mechanisms 172, 174, 176, 178 with each fastening mechanism 172, 174, 176, 178 being positioned on a corner of the top surface 170 of the headrest, as depicted in FIG. 4, and the removable cover 118 can include four corresponding fastening mechanisms 372, 374, 376, 378 with each fastening mechanism 372, 374, 376, 378 positioned on a corner of the bottom surface 314 of the removable cover 118, as depicted in FIG. 9B. As such, when the bottom surface 314 of the removable cover 118 is aligned with and positioned on the top surface 170 of the headrest 112, the fastening mechanism 172, 174, 176, 178 of the headrest 112 engage with the fastening mechanisms 372, 374, 376, 378 on the removable cover 118, releasably coupling the removable cover 118 onto the headrest 112. In some implementations, one or more hook and loop fasteners are used to releasably couple the removable cover 118 to the headrest 112.

Once the mat has been unfolded and the removable cover is attached to the headrest of the mat, a protective covering can be positioned over all or part of the mat and/or removable cover (1206). For example, FIG. 10 depicts a protective covering 402 that is positioned over and covers the mat 102 and the removable cover 118 of the patient positioning system 100. The protective covering 402 may be made of a biocompatible material, such as paper, cloth, or a polymer (e.g., having an antimicrobial surface). In some implementations, the protective covering 402 is attached to the mat 102 and/or the removable cover 118 using one or more fastening mechanisms, such as one or more elastic bands. In some implementations, the protective covering 402 is a sleeve, and the mat 102 and/or the removable cover 118 are inserted into the protective covering. In some implementations, the protective covering 402 only covers the body portion 104 of the mat 102 or only covers the head portion 106 of the mat 102 and the removable cover 118. In some implementations, the protective covering 402 only covers the removable cover 118. In some implementations, separate protective coverings 402 are used to cover different parts of the mat 102 and removable cover 118.

Once the mat is prepared using one or more of steps 1202-1206, a patient's trunk is positioned on the body portion of the mat (1208) and the patient's head is positioned on the removable cover coupled to the head portion of the mat (1210) with the patient lying in a prone position. For example, at least a portion of the patient's trunk (e.g., torso) is positioned on the body portion 104 of the mat 102 and the patient's head is positioned on the head portion 106 of the mat (e.g., on headrest 112), or on the removable cover 118 if the removable cover 118 is attached to the headrest 112, with the client lying face down in the prone position. In some implementations, the patient's torso and at least a portion of the patient's legs are positioned on the body portion 104 of the mat 102 and the patient's face is positioned through an opening 117, 127 in the removable cover 118 and the headrest 112, as shown in FIGS. 6 and 7.

In some implementations, the curvature of the patient's neck is adjusted using the patient positioning system (1212). In some implementations, support legs 114, 116 of the head portion 106 of the mat 102 can be extended or retracted to adjust the positioning of headrest 112, which in turn adjusts the position of the patient's head and curvature of the patient's neck. For example, retracting the support legs 114, 116 from a fully extended position 150 (shown in FIG. 6) to a fully retracted position 152 (shown in FIG. 7), lowers the front side 129 of the headrest 112 towards the surface 130 on which the mat 102 is positioned, which changes the angle of the headrest 112 relative to the surface 130 on which the mat 102 is positioned and the front side 138 of the first mat section 108. The patient's forehead is lowered together with the front 129 of the headrest 112 towards the surface 130, which changes the curvature of the patient's neck 210. For example, the patient's neck 210 is flatter (e.g., more kyphotic) when the support legs 114, 116 are in the fully retracted position 152 (as shown in FIG. 7) compared to when the support legs 114, 116 are in the fully extended position 150 (as shown in FIG. 6). In some implementations, the support legs 114, 116 have two or more positions, and the curvature of the patient's neck is adjusted by positioning the support legs 114, 116 in one of the two or more positions. The position of the support legs 114, 116 can be adjusted before the patient 202 is positioned on the system 100 or while the patient 202 is lying on the mat 102.

Once the patient is properly positioned, a medical procedure can be performed on the patient (1214). The patient positioning system 100 can be used to help maintain the patient's positioning during a medical procedure. For example, during performance of a kyphoplasty procedure, the patient positioning system 100 can be used to position the patient in a prone position to provide the physician with improved access to a targeted site along the patient's vertebrae. In addition, the patient positioning system 100 can orient the patient in a selected prone position to improve or alleviate breathing difficulties. For example, the patient positioning system 100 can be used to assist patients being treated for acute respiratory distress syndrome (ARDS) to comfortably lie flat and maintain a prone position in order to improve respiration and relieve breathing difficulties. In some implementations, the patient positioning system 100 can be used to orient the patient in a selected prone position for performing an intubation procedure or a ventilation procedure. In addition, the patient positioning system 100 can be used to help patients maintain a prone position while wearing oxygen support equipment.

After completing the medical treatment, if a protective covering was used, the protective covering can be removed from the mat (1216). By removing and replacing the protective covering 402 between patients, the mat 102 and removable cover 118 are kept clean over the course of multiple medical procedures. In some implementations, the protective covering 402 is made of a disposable material, such as paper, and is disposed of after completing a medical procedure performed using the protective covering 402. In some implementations, the protective covering 402 is made of a reusable material, such as plastic or cloth, and is sanitized for reuse following completion of a medical procedure performed using the protective covering 402.

In some implementations, the patient positioning system is folded after completing the medical procedure (1218). For example, the patient positioning system 100 may be folded for transportation or storage following completion of the medical procedure. An example process of folding the patient positioning system is described above with reference to FIG. 11. In some implementations, the removable cover 118 is removed from the headrest 112 of the mat 102 prior to folding the mat 102.

Figure 13:
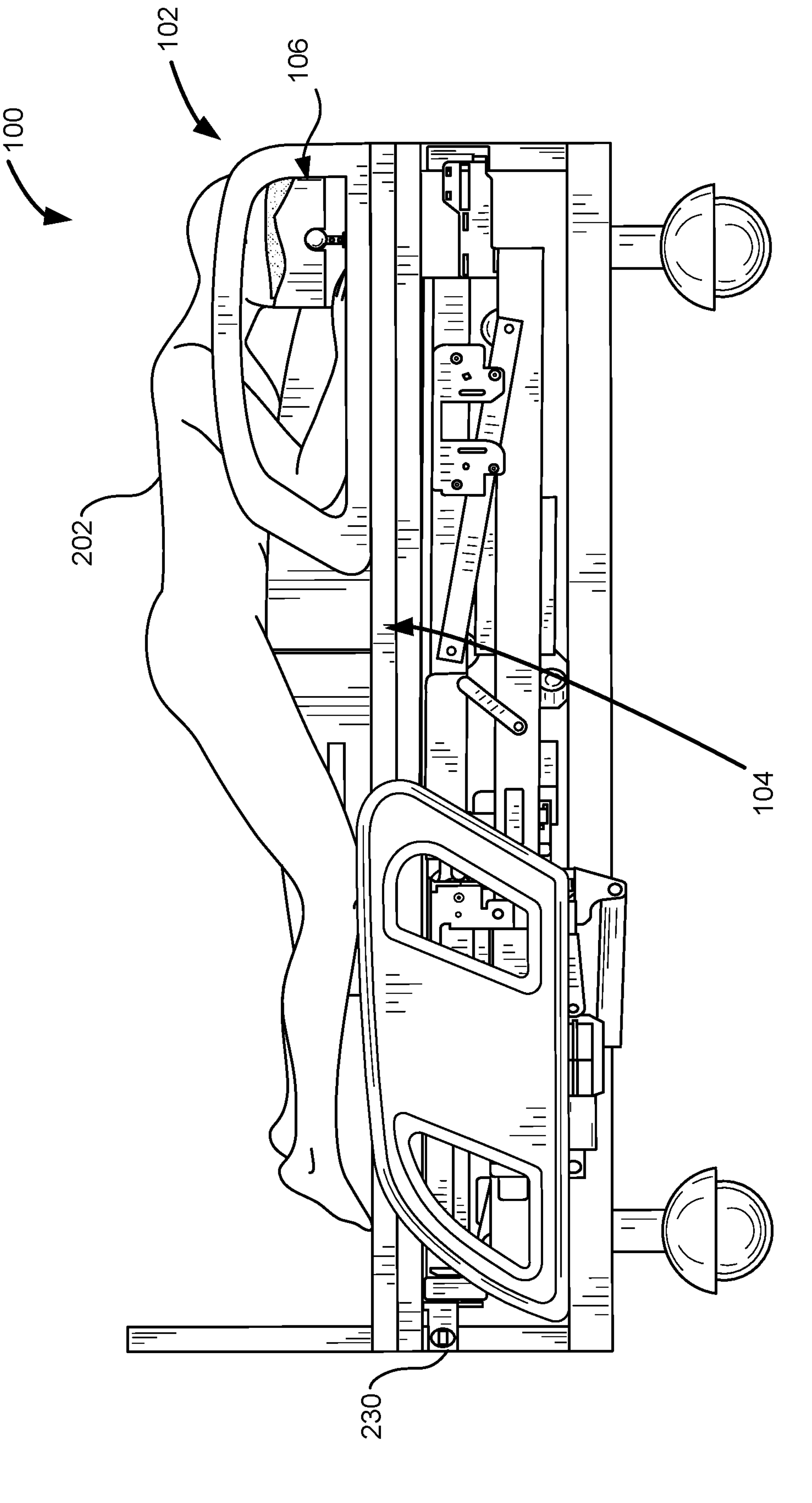
FIG. 13 is a side view of the patient positioning system of FIG. 1 positioned on a hospital bed with a patient positioned on the patient positioning system and the headrest of the system in a neutral position.

While the patient positioning system 100 has been described as being supported by a medical table 130 during a medical procedure, the patient positioning system 100 can be used in conjunction with and supported by other surfaces. For example, referring to FIG. 13, the patient positioning system 100 can be used to help position a patient in a prone position on a hospital bed 230. As can be seen in FIG. 13, the mat 102 can be positioned and unfolded on the hospital bed 230 to help a patient 202 more comfortably lie in a prone position on the hospital bed 230. In some implementations, the patient positioning system 100 can be help the patient lie in a prone position while the patient is wearing an oxygenation apparatus on the patient's face. For example, the head portion 106 of the mat can be adjusted to elevate the patient's head above the surface of the hospital bed 230 to prevent the oxygenation apparatus from contacting the hospital bed 230 when the patient is lying in a prone position on the hospital bed 230.

In some cases, the positioning system 100 can be placed on a hospital bed 230 in order to help patients being treated for acute respiratory distress syndrome (ARDS), respiratory failure, COVID-19, or other respiratory conditions comfortably lie in a prone position on the hospital bed 230 for a prolonged period (for example, for several hours) in order to aid oxygenation. In some cases, helping a patient maintain a prone position on the hospital bed 230 using the patient positioning system 100 may help to avoid or delay intubation of the patient.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A patient positioning system comprising:
- a mat comprising:
  - a body portion configured to support at least a portion of a patient's body in a prone position;
  - a head portion coupled to the body portion, the head portion comprising:
    - a headrest configured to support a patient's head; and
    - two adjustable support legs coupled to opposite lateral sides of the headrest, the two support legs are configured to fold inwards towards a bottom surface and along the opposite lateral sides of the headrest, and the headrest is configured to fold inwards toward the body portion of the mat with the adjustable support legs folded towards the bottom surface and along the opposite lateral sides of the headrest; and
- a removable cover configured to releasably couple to the headrest.

2. The system of claim 1, wherein the body portion comprises:
- a first mat section; and
- a second mat section coupled to the first mat section, the second mat section being configured to fold relative to the first mat section.

3. The system of claim 2, wherein the head portion is configured to fold relative to the first mat section.

4. The patient positioning system of claim 3, wherein the body portion further comprises:

a first flexible connector coupled to and extending along a first side to the first mat section and coupled to and extending along a second side to the second mat section; and a second flexible connector coupled to and extending along a first side to the headrest and coupled to and extending along a second side to the first mat section, wherein:

the second mat section is configured to fold towards the first mat section along the first flexible connector; and the head portion is configured to fold towards the first mat section along the second flexible connector.

5. The patient positioning system of claim 4, wherein the body portion further comprises a handle coupled to the first mat section or the second mat section.

6. The patient positioning system of claim 5, wherein the first mat section and the second mat section comprise a deformable material.

7. The patient positioning system of claim 6, wherein the first mat section and the second mat section each comprise a convex curved upper surface.

8. The patient positioning system of claim 6, wherein the first mat section and the second mat section each comprise a polymer material.

9. The patient positioning system of claim 1, wherein the support legs are adjustable between an extended position and a retracted position; and adjustment of the support legs changes an angle of the headrest relative to the body portion of the mat.

10. The patient positioning system of claim 9, wherein:

the headrest is configured to fold inwards toward a front side of the body portion of the mat with the adjustable support legs folded towards the bottom surface and along the opposite lateral sides of the headrest.

11. The patient positioning system of claim 10, wherein the support leg is configured to prevent a patient's face from contacting a surface on which the body portion is positioned.

12. The patient positioning system of claim 10, wherein the support legs comprise two telescoping support legs coupled to opposite sides of the headrest.

13. The patient positioning system of claim 1, wherein the removable cover comprises a foam material configured to support a patient's face.

14. The patient positioning system of claim 13, wherein the headrest and the removable cover each define an opening therethrough for accommodating a patient's face when a patient is lying in the prone position.

15. The patient positioning system of claim 14, wherein the headrest and the removable cover each define a notch that extends vertically through the headrest from a top surface of the headrest to a bottom surface of the headrest, the notch is configured to route a medical instrument, line, or tube around the patient's head.

16. The patient positioning system of claim 15, further comprising:

one or more fastening elements configured to releasably couple the removable cover to the headrest.

17. The patient positioning system of claim 16, wherein the one or more fastening elements comprise:

a first hook and loop fastener positioned on a top surface of the headrest; and a second hook and loop fastener positioned on a bottom surface of the cover, wherein the second hook and loop fastener is configured to releasably couple to the first hook and loop fastener.

18. The patient positioning system of claim 17, further comprising a protective covering configured to cover the mat and the removable cover.

19. The patient positioning system of claim 18, wherein the protective covering comprises paper, cloth, or polymer material.

* * * * *